Patented Nov. 7, 1950

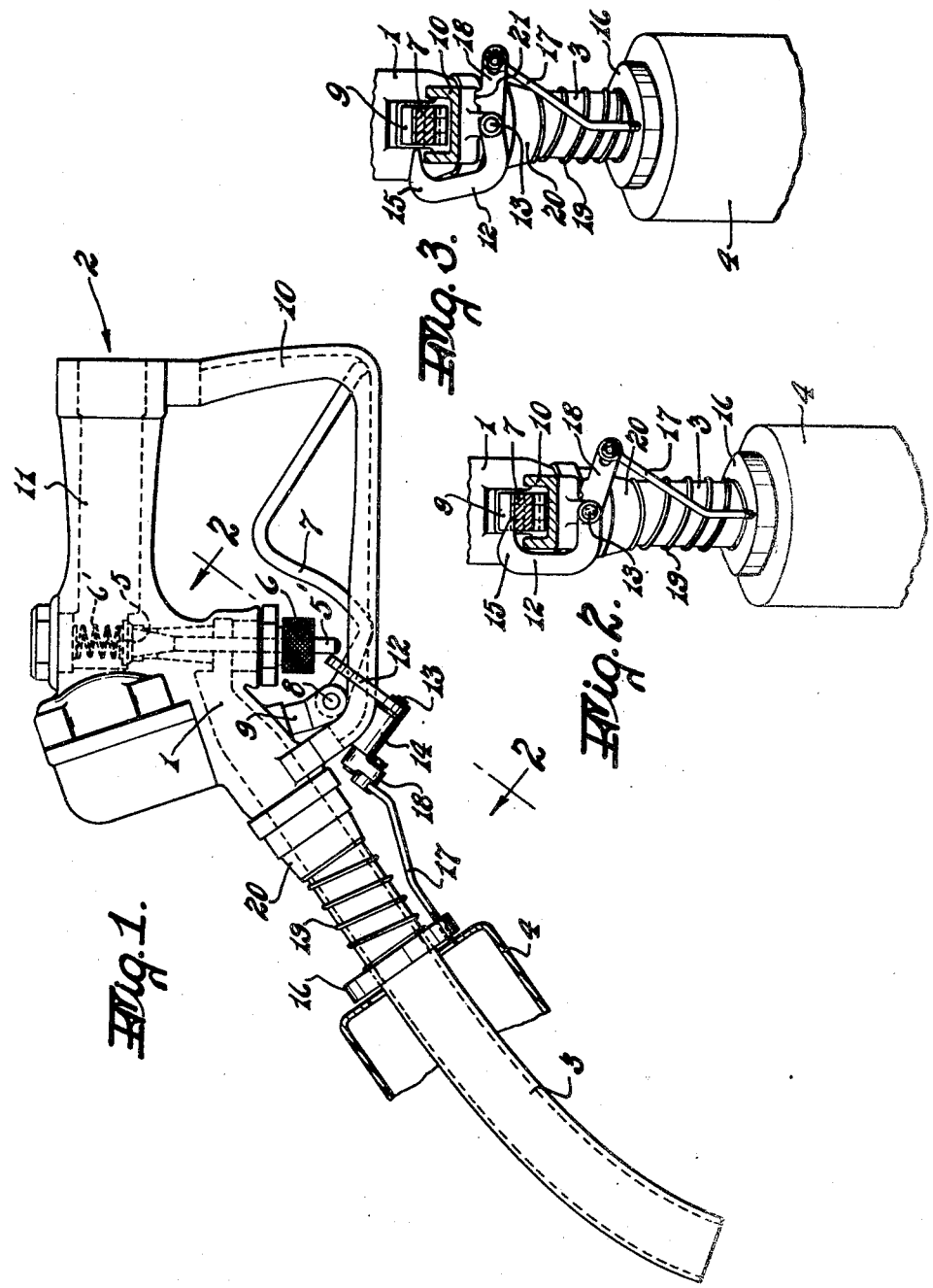

2,528,696

UNITED STATES PATENT OFFICE 2,528,696

LATCHING MEANS FOR HOSE NOZZLE VALVES

Joseph A. Logan, Hadley, and Eugene V. Lavallee, South Hadley Falls, Mass., assignors to Gilbert & Barker Manufacturing Company, West Springfield, Mass., a corporation of Massachusetts Application September 7, 1949, Serial No. 114,326

4 Claims. (Cl. 226—93)

This invention relates to improvements in hose nozzles, such for example, as are suitable for use on the end of the hose of a gasoline measuring and dispensing pump for directing the dispensed gasoline into the fill pipe of the fuel tank of an automobile.

The invention finds one advantageous use in connection with the gasoline pumps used at the so-called "self-service" stations, where the customer gets the gasoline cheaper by handling the dispensing hose and nozzle and controlling the filling of his own automobile fuel tank. The nozzle embodies the usual valve, which is spring-actuated to closed position and which is opened by manually moving a pivoted lever toward the body of the nozzle. There is the danger that an inexperienced person, when grasping the nozzle body, while carrying the nozzle to the fuel tank, might inadvertently press on the valve lever and cause the valve to be opened before the nozzle is inserted in the fill pipe of the fuel tank, thus resulting in loss of gasoline and the creation of a fire hazard.

This invention has for an object the provision of means in a hose nozzle of the type described for preventing the valve of the nozzle from being opened until the spout of the nozzle has been inserted into the fill pipe of the fuel tank.

One illustrative example of the invention is shown in the accompanying drawings, in which:

Fig. 1 is an elevational view of a hose nozzle embodying the invention;

Fig. 2 is a fragmentary cross sectional view taken on the line 2—2 of Fig. 1 and showing the nozzle-valve-actuating lever latched in valve-closing position; and Fig. 3 is a view, taken similarly to Fig. 2 but showing the nozzle-valve-actuating lever unlatched.

Referring to these drawings; the invention has been shown, by way of illustrative example, as embodied, in a hose nozzle of the type disclosed in the A. H. Davis, Jr. Patent No. 2,320,033, granted May 25, 1943. The invention is, however, capable of use in any other hose nozzle of the type, having a manually actuated lever for opening the nozzle valve and is not limited to details of the one nozzle construction shown herein for illustrative purposes.

The nozzle includes a tubular body 1 having at one end an inlet at 2, adapted for connection to the delivery end of the hose of a gasoline pump and a tubular spout 3 connected to its other end and adapted for insertion into the filling opening of a tank and as shown into the fill pipe shown in part at 4, of the fuel tank of an automobile. Within the nozzle body is a valve 5 for controlling the flow through the passage through the tubular body and spout. This valve is moved by a spring 6' into the position shown to close off such passage and has a stem 5', which extends outwardly through a suitable stuffing box 6 in position to be actuated by a hand lever 7. The latter is pivoted at 8 to a member 9, carried by the nozzle body. The usual guard 10, of channel-shaped cross section, extends from one end of the nozzle body to the other to protect the nozzle lever 7 from accidental movement. The nozzle body has an approximately cylindrical portion 11, by which it is grasped by the hand of the operator, the fingers extending beneath the outer portion of lever 7 in readiness to draw the latter toward the part 11 to open the nozzle valve. The nozzle, as thus far described is of the usual and well known form which is in general use at gasoline filling stations.

The nozzle may also, and desirably has, the provisions shown in said patent or others for the purpose of automatically closing the nozzle valve when the fuel tank being serviced has been sufficiently filled. The member 9 is the shiftable, fulcrum-carrying member of said patent. These provisions would appear to be desirable at self-service stations to prevent overflowing the tank when the nozzle is used by untrained operators.

This invention provides for restraining the opening of the nozzle valve 5 until the spout 3 of the nozzle has been inserted in the fill pipe, such as 4, of the fuel tank. An arm 12, fixed at one end to one end of a shaft 13, mounted in a bearing 14, provided on guard 10, has at its other end a hook 15 adapted, when positioned as in Fig. 2, to overlie the valve-actuating lever 7 and prevent it from being moved toward the handle portion 11 to open the valve 5 and adapted, when positioned as in Fig. 3, to release the lever 7 and permit it to be moved to open the nozzle valve 5. The arm 12 and its hook 15 form a latch. Slidably mounted on the nozzle spout 3 is a collar 16, which is connected by a link 17 to one end of an arm 18. This arm 18 is fixed at its other end to the other end of shaft 13 and the two arms 12 and 18 abut opposite ends of bearing 14 and limit axial movement of shaft 13. A spring 19, encompassing spout 3 acts between the outlet end 20 of the nozzle body 1 and the collar 16 with a tendency to move the collar downwardly on the spout. The spring acts through the collar 16, link 17, arm 18, and shaft 12 to hold the latch arm 12 in the restraining position shown in Fig. 2. When the spout 3 is inserted in fill pipe 4, the collar 16 is forced upwardly on the spout 3, thereby causing shaft 13 to turn and swing the latch arm out of restraining position and into the position shown in Fig. 3, in which position the lever 7 is free to be drawn upwardly in the usual way to open the nozzle valve 5. The arm 12 is limited in its outward (counter clockwise as viewed in Figs. 2 and 3) swinging movement by the abutment of a stop 21 (Fig. 3) with the underside of guard 10. When the spout 3 is withdrawn from fill pipe 4 after the fuel tank has been sufficiently filled, the spring 19 will move collar 16 downwardly and cause the latch arm 12 to latch the lever 7 provided that the lever has been released by the operator, as it should have been, and allowed to move into the closed position shown. If the lever is not in its lowest position, the latch will engage the side of the lever and move inwardly when the lever is finally released. If the automatic shut-off provisions of said patent, or others for the same purpose, are used, as is desirable, the nozzle valve 5 will automatically close even though the operator still holds the lever 7 drawn toward the handle portion 11. The member 9 with the fulcrum 8 of the lever 7 is movable downwardly, according to said patent, to allow the valve to close and this will carry the fulcrummed end of lever 7 below the hook 15 of the latch arm 12 even though the outer and hand grip portion of lever 7 is held raised against the nozzle body.

The invention thus provides provisions for restraining opening of the nozzle valve until its spout has been inserted in the fill pipe of the fuel tank being serviced.

What is claimed is:

1. The combination in a hose nozzle having a passage therethrough terminating in a delivery spout adapted for insertion in the filling opening of a tank, a valve for controlling the flow through said passage, and manually operable means for moving the valve, of a latch preventing opening of the valve by said means, a member movably mounted on said spout and adapted to be engaged and moved by abutment with the wall of the filling opening when the delivery spout is inserted in such opening, and connections between said latch and member operable by such movement of said member to release the latch and enable opening of the valve by said means.

2. The combination in a hose nozzle having a passage therethrough terminating in a delivery spout adapted for insertion in the filling opening of a tank, a valve for controlling the flow through said passage, and a manually-operable lever for actuating the valve and movable from a position in which the valve is closed to various other positions in which the valve is opened to various degrees, of a latch engageable with said lever for holding it in the first-named position, a member mounted on said spout and adapted to be engaged and moved by abutment with the wall of said opening when the spout of the nozzle is inserted therein, and connections between said latch and member for moving the latch to release the lever by the movement of said member caused by insertion of the spout of the nozzle in said opening.

3. The combination in a hose nozzle having a passage therethrough terminating in a delivery spout adapted for insertion in the filling opening of a tank, a valve for controlling the flow through said passage, and manually operable means for moving the valve, of a latch preventing opening of the valve by said means, a member mounted on the exterior of said spout for limited movement back and forth, a spring for moving said member to and holding it at one end of its stroke, and connections between said latch and member whereby the movement of said member to said end of its stroke by said spring moves the latch into position to prevent opening of said valve, said member adapted to be engaged by the wall of the filling opening when the nozzle is inserted into said opening and moved by abutment with such wall against the force of said spring to the other end of its stroke to move said latch into position to enable opening of said valve.

4. The combination in a hose nozzle having a passage therethrough terminating in a delivery spout adapted for insertion in the filling opening of a tank, a valve for controlling the flow through said passage, and a manually-operable lever for actuating the valve and movable from a position in which the valve is closed to various other positions in which the valve is opened to various degrees, of a latch engageable with said lever for holding it in the first-named position, a member mounted on the exterior of said spout for limited movement back and forth, a spring for moving said member to and holding it at one end of its stroke, and connections between said latch and member whereby the movement of said member to said end of its stroke by said spring moves the latch into lever-latching position, said member adapted to be engaged by the wall of the filling opening, when the nozzle is inserted in such opening, and moved by abutment with said wall against the force of said spring to the other end of its stroke to move the latch into position to release said lever and enable it to be moved to open said valve.

JOSEPH A. LOGAN.
EUGENE V. LAVALLEE.

No references cited.